(12) United States Patent
Schlunt et al.

(10) Patent No.: US 8,343,391 B2
(45) Date of Patent: *Jan. 1, 2013

(54) COMPOSITIONS FOR THE PREPARATION OF COMPOSITE PHOTOCHROMIC POLYCARBONATE LENSES

(75) Inventors: Paul D. Schlunt, Oceanside, CA (US); Thomas J. Engardio, Vista, CA (US)

(73) Assignee: Signet Armorlite, Inc., San Marcos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/930,726

(22) Filed: Jan. 14, 2011

(65) Prior Publication Data

US 2012/0018686 A1    Jan. 26, 2012

Related U.S. Application Data

(62) Division of application No. 12/317,889, filed on Dec. 30, 2008, now Pat. No. 7,892,459, which is a division of application No. 10/605,802, filed on Oct. 28, 2003, now Pat. No. 7,488,510.

(51) Int. Cl.
*G02B 5/23* (2006.01)
*B05D 5/06* (2006.01)

(52) U.S. Cl. .............. 252/586; 106/287.24; 106/287.25; 252/582; 351/152; 351/162; 351/163; 359/241; 427/162; 427/164; 523/135; 524/95; 524/104; 524/110; 526/314

(58) Field of Classification Search ............. 106/287.24, 106/287.25; 252/582, 586; 351/152, 162, 351/163; 359/241; 427/162, 164; 523/135; 524/94, 104, 110; 526/314
See application file for complete search history.

(56) References Cited

U.S. PATENT DOCUMENTS

| 6,811,830 B2 * | 11/2004 | Toh et al. ................. 427/517 |
| 6,863,844 B2 * | 3/2005 | Engardio et al. ............. 252/586 |
| 7,488,510 B2 * | 2/2009 | Schlunt et al. .............. 427/162 |
| 7,892,459 B2 * | 2/2011 | Schlunt et al. .............. 252/586 |
| 2003/0008149 A1 * | 1/2003 | Moravec et al. ............. 428/412 |
| 2004/0041287 A1 * | 3/2004 | Engardio et al. ............. 264/1.7 |

FOREIGN PATENT DOCUMENTS

| WO | WO 96/10760 | * | 4/1996 |
| WO | WO 96/34025 | * | 10/1996 |
| WO | WO 97/27223 | * | 7/1997 |
| WO | WO 99/11682 | * | 3/1999 |

* cited by examiner

*Primary Examiner* — Ling-Siu Choi
*Assistant Examiner* — Bijan Ahvazi
(74) *Attorney, Agent, or Firm* — Ice Miller LLP

(57) ABSTRACT

Photochromic matrix compositions and tie layer compositions useful for the preparation of photochromic polycarbonate lenses are disclosed. The tie layer compositions facilitate adhesion of the photochromic matrix composition to the polycarbonate lens. The photochromic matrix compositions can contain a flexible hydrophilic dimethacrylate monomer, one or more hydrophobic monomers, a flexible hydrophobic multi(meth)acrylate monomer, one or more urethane methacrylate oligomers, and one or more photochromic dyes. The tie layer compositions can contain one or more methacrylate monomers, a (meth)acrylated oligomer with a polycarbonate backbone, one or more urethane methacrylate oligomers, and a solvent or solvent mixture. Methods of preparing photochromic polycarbonate lenses are also disclosed, involving the serial application of the tie layer composition, then the photochromic matrix composition to the lens.

16 Claims, No Drawings

COMPOSITIONS FOR THE PREPARATION OF COMPOSITE PHOTOCHROMIC POLYCARBONATE LENSES

This application is a divisional of prior application Ser. No. 12/317,889, filed Dec. 30, 2008, now U.S. Pat. No. 7,892,459 which is a divisional of application Ser. No. 10/605,802, filed Oct. 28, 2003, now U.S. Pat. No. 7,488,510, which are hereby incorporated by reference in their entirety.

BACKGROUND OF INVENTION

1. Field of the Invention

The invention relates to compositions and methods for the preparation of a photochromic polycarbonate lens. In particular, methods involving the use of a tie coating to adhere a photochromic matrix to a polycarbonate lens are disclosed.

2. Description of the Related Art

Individuals who wear prescription corrective eyeglasses have several alternatives when moving from low light conditions (e.g. indoors) to high light conditions (e.g. outdoors in sunlight). First, a second pair of prescription eyeglasses having permanently darkened lenses can be used. This has the advantage of being permanently darkened or tinted, but this necessitates the purchase and carrying of two sets of eyeglasses for comfortable vision in low light (indoor or night) and high light (outside sunlight) conditions, and the individual can easily lose or misplace whichever pair of eyeglasses is not currently in use. As a second option, permanently darkened non-corrective lenses can be attached to the corrective eyeglasses. These can be attached in a variety of ways, such as using a hinge, mechanical clips, or magnets. The non-corrective lenses must also be purchased, carried, and are at risk of being lost or misplaced. A third option is to have the corrective eyeglass lenses be photochromic, changing from transparent in low light conditions, to darkened in high light conditions.

Plastic photochromic lenses have been on the market for well over a decade. Their photochromic performance has improved as the technology has progressed. Measurement parameters reflecting photochromic performance include:

Faded transmission: a high level of visible light transmission through the lens is most desirable (when in room light or away from direct or intense reflected sunlight);

Darkened transmission: a low level of light transmission through the lens is most desirable (when exposed to sunlight);

Dynamic range: the difference in the percent of light transmission through the lens between the fully faded state and the darkened state. A wide range is most desirable;

Thermal stability: sustained low light transmission when the lens is exposed to sunlight in a hot environment (e.g. desert or tropical). Minimizing the reduction of dynamic range at higher temperatures is most desirable;

Time to darken from faded state to darkened state: a short time period is most desirable;

Time to fade from the darkened state to the faded state: a short time period is most desirable; and The ability to fade in a reasonable amount of time when darkened in a cold environment (e.g. winter weather): a short time period is most desirable.

Ideally, photochromic lenses exhibit high faded transmission, low darkened transmission, a wide range of transmission between faded and darkened states, rapid conversion between faded and darkened states, and good long term stability. These performance characteristics are generally expected to be maintained for at least a two year lifetime.

Polycarbonate lenses are increasingly gaining popularity with corrective eyeglass consumers. Polycarbonate lenses have attractive price, impact strength, high index of refraction, and lower weight (i.e. low density) attributes as compared to conventional glass or plastic lenses.

It is desirable to make photochromic polycarbonate lenses because of the market demand for polycarbonate lenses in general. Price, high refractive index, impact strength and low density are popular attributes desired by lens customers, and polycarbonate lens blanks are relatively inexpensive to make. Clear optical grade polycarbonate is a widely available commodity, and the injection molding process allows for a clean mass-production manufacturing operation. However, making a polycarbonate lens with photochromic properties presents a unique set of challenges. Commercially available photochromic dyes do not perform satisfactorily when mixed directly into polycarbonate thermoplastic resin. The heat and time necessary for injection molding the polycarbonate degrades most dyes. Additionally, the flexural modulus and crystallinity of the solidified thermoplastic can interfere with the dye's ability to change states. Polycarbonate does not directly bond to many materials that provide environments favorable to photochromic dye performance, and polycarbonate is severely altered by many chemical species.

Various patents have issued describing attempts to overcome various challenges posed by the production of photochromic polycarbonate lenses.

U.S. Pat. No. 5,523,030 (issued Jun. 4, 1996) describes a double injection molding process in which a thermoplastic, loaded with photochromic dye, is injection molded into a cavity. After the first shot has cooled below its glass transition temperature, a second shot of a thermoplastic (such as polycarbonate) is delivered into the enlarged cavity. Upon cooling, the lens blank is to have no distinct phase boundary. This method conserves expensive dyes. This patent did not address the lack of photochromic performance that would exist in a polycarbonate-like photochromic layer capable of leaving no phase boundary.

U.S. Pat. No. 6,367,930 (issued Apr. 9, 2002) suggests the use of a more photochromic friendly thermoplastic. In this document, the thermoplastic polyurethane containing the photochromic dye is either: placed in the mold cavity first as a film, and the cavity subsequently injected with polycarbonate; or, the cavity is first injection molded with polycarbonate, the cavity enlarged and a second injection is made with the photochromic polyurethane.

U.S. Pat. No. 5,827,614 (issued Oct. 27, 1998) and U.S. Pat. No. 6,328,446 (issued Dec. 11, 2001) concern the use of a layered film where the exterior layers are thermoplastic, and the interior layer is "functional", being either photochromic or dichroic. These films can be placed against the mold base and followed with an injection of polycarbonate.

Coating methods are popular with many lens manufacturers because they do not require special injection molding. equipment, or added operations with the mold cavities. Additionally, commonly available coating equipment could be employed in the photochromic coating application with some modification (e.g. speed, nozzle, light source). The photochromic coating could also be applied by an outside service firm.

The majority of photochromic polycarbonate lenses on the market today are made through the use of coatings applied to polycarbonate lens blanks. The coatings tend to be 10-30 microns thick. U.S. Pat. No. 6,025,026 (issued Feb. 15, 2000) describes this approach using organic anhydrides and/or isocyanates. A polymeric substrate lens is treated to provide surface reactive groups, and a polymerizable composition is applied to the surface to create an adherent polymeric layer. The polymerizable composition can contain photochromic or tinting agents.

U.S. Pat. No. 6,150,430 (issued Nov. 21, 2000) describes the use of organofunctional silanes and actinic radiation to adhere photochromic coatings onto a polymeric substrate. A polymerizable composition of a surface modifying amount of an organofunctional silane, a catalyzing amount of material which generates acid upon exposure to actinic radiation, and a solvating amount of solvent is applied to the surface of a polymer modified to contain reactive functional groups. Next, the surface is treated with actinic radiation. Finally, a photochromic or non-photochromic polymer-forming composition is applied and cured.

U.S. Patent Application No. 2002/0136899 (published Sep. 26, 2002) describes the formulation and use of a photochromic elastomeric polyurethane coating on various lens substrates, including polycarbonate. Preferred elastomers include chlorosulfonated polyethylene, fluoroelastomers, neoprene, polysulfide, and polyurethane.

A composite lens in which the outer layer, containing the photochromic dye, is on the order of 0.5-1.5 mm thick offers a more robust format than a thin coating. The photochromic functionality of the layer is not lost when the surface is scratched. A deeper dye-containing layer also has the potential of sustaining viable photochromic dye molecules over the intended life of the lens when exposed to solar UV radiation. The challenge is to provide a cast composite layer system that adheres to the polycarbonate through lens processing, edging, frame assembly and normal wear. A thick layer can have more internal stress problems than a thin coating, and stress and/or adhesion problems resulting from such thick layers have often prohibited the successful marketing of photochromic polycarbonate lenses with a cast composite layer.

U.S. Pat. No. 5,219,497 (issued Jun. 15, 1993) describes a method of casting a composite layer on a variety of plastics for producing finished plastic aspheric multifocal or progressive lenses. A photochromic composition containing a UV initiator is coated onto a preformed lens in a mold, and is polymerized using UV light and heat.

U.S. Pat. No. 5,914,174 (issued Jun. 22, 1999) concerns a method of manufacturing composite photochromic lenses in which the composite layer is 25-1000 micrometers in thickness. A "precoat resin" containing the photochromic dyes is coated or formed onto the concave surface of a mold. In one embodiment, a lens body may be cast onto the mold with "precoat resin". In another embodiment, the mold with the "precoat resin" has a polymerizable resin added to it, and a lens blank is then contacted to the mold assembly. The "precoat" resin is gelled to the point of using up all the initiator prior to the assembly process. The resin contains a mixture of at least two polymerizable components, at least one photochromic additive, at least one additive and at least one polymerization initiator. The mixture of at least two polymerizable components is preferably selected from monofunctional, difunctional and multifunctional acrylates and methacrylates.

U.S. Pat. No. 6,455,653 (issued Sep. 24, 2002) suggests the use of ethoxylated bisphenol A diacrylates in the photochromic layer of composite lenses. The photochromic compositions are coated onto a preformed lens in a mold. Polymerization of the composition is performed by a two stage process involving a first low intensity UV light step, followed by a high intensity UV light step. The composition is preferably heated to about its glass transition temperature prior to polymerization.

Another possible solution to the challenge of adhering of the composite layer to the lens body is illustrated in U.S. Pat. No. 5,316,702 (issued May 31, 1994). A method of casting the lens preform with a regular pattern of grooves to improve adhesion to the cast composite layer is described. The liquid resin and the preform interact at a contact angle of 20 to 45 degrees in order to optimize spreading of the resin on the preform.

Despite the extensive efforts already described that attempt to overcome the challenges inherent in the production of photochromic polycarbonate lenses, there still exists a need for new materials and methods for the production of these commercially important lenses.

SUMMARY OF INVENTION

Photochromic polymer matrix compositions and tie coating compositions are disclosed. The tie coating composition allows the photochromic matrix composition to adhere to a polycarbonate lens blank. The compositions can be used to prepare photochromic polycarbonate lenses having attractive photochromic performance relative to conventional lenses, while avoiding difficulties commonly encountered during the preparation of photochromic polycarbonate lenses.

DETAILED DESCRIPTION

The present invention relates to materials and methods useful for the preparation of photochromic polycarbonate lenses. It is desirable that the photochromic lenses have a wide photochromic dynamic range. Dynamic range is the difference between transmission of visible light while in the darkened state and in the unexposed faded state. Additionally, it is desirable that photochromic lenses have rapid darkening and fading kinetics. It is also preferable that the lenses be relatively simple and inexpensive to prepare on a commercial scale.

The various embodiments of the invention are directed towards photochromic compositions, tie layer compositions, photochromic polycarbonate lenses prepared using the photochromic and tie layer compositions, and methods for their preparation and use. While compositions and methods are described in terms of "comprising" various components or steps, the compositions and methods can also "consist essentially of" or "consist of" the various components and steps.

Photochromic Matrix Layer Compositions

The following properties have been observed in the polymerized forms of the compositions of the current invention:

Methacrylate monomers provide superior photochromic performance over acrylate monomers in most cases. Compositions containing methacrylates have a wider dynamic range than similar compositions containing corresponding acrylates.

Flexible difunctional hydrophilic monomers favor high light transmission in the faded state and fast fading kinetics.

Hydrophobic monomers favor darker activated states than hydrophilic monomers, and can thus expand the dynamic range of a polymer system when used in combination.

Flexible hydrophobic multifunctional (functionality greater than 2) monomers promote photochromic temperature stability and color depth (darkness) when activated. However, the faded transmission of these polymer systems is lower than that encountered with the mono or difunctional hydrophobic systems.

Methacrylated urethane oligomers minimize the shrinkage of polymerizable mixtures of the monomers mentioned above when they are added at levels greater than about 20%.

While various embodiments of the invention are described as "comprising" various components or steps, they can also "consist essentially of" or "consist of" the various components or steps.

One embodiment of the invention is directed towards photochromic matrix layer compositions containing a monomer mixture of various (meth)acrylates and at least one photochromic dye. The word "(meth) acrylate" refers to a compound containing an acrylate or methacrylate group. The composition can comprise a flexible hydrophilic dimethacrylate monomer, one or more hydrophobic monomers, a flexible hydrophobic multi(meth)acrylate monomer, a urethane methacrylate oligomer, and a photochromic dye. The word "multi (meth)acrylate" refers to a compound containing three or more methacrylate groups or acrylate groups (e.g. 3, 4, 5, 6, 7, 8, 9, 10, and so on).

The flexible hydrophilic dimethacrylate monomer preferably is a polymeric dimethacrylate. The monomer generally has a long chain, oxygen containing backbone and two methacrylate moieties. Examples of such monomers include polyethylene glycol dimethacrylates (available from Sartomer (Exton, Pa.) and others), urethane dimethacrylates (such as diurethane dimethacrylate available from Rohm America (Piscataway, N.J.)), epoxy dimethacrylates, and polyester dimethacrylates. A presently preferred flexible difunctional hydrophilic monomer is polyethylene glycol (400) dimethacrylate.

The flexible hydrophilic dimethacrylate monomer can generally be present at any concentration. Presently preferred concentrations are from about 20 weight percent to about 50 weight percent, or more preferably from about 25 weight percent to about 40 weight percent of the monomer mixture.

The hydrophobic monomer is preferably a monomethacrylate, a dimethacrylate, or a trimethacrylate. The monomer generally has an aliphatic structure such as a long chain saturated backbone or an aliphatic polycyclic structure. Presently preferred monomers are isobornyl methacrylate, 1,12-dodecanediol dimethacrylate, tridecyl methacrylate, isodecyl methacrylate, and lauryl methacrylate. Isobornyl methacrylate is a bicyclic monomer used as a stiffener to improve tear strength and glass transition temperature (Tg), but too high a concentration reduces fade speed. A preferred hydrophobic difunctional monomer would be 1,12-dodecanediol dimethacrylate used at about 0 weight percent to about 15 weight percent of the total monomer content. The 1,12-dodecanediol dimethacrylate is one of the few long chain hydrophobic difunctionals currently commercially available and is primarily used for dental applications. It provides flexible crosslinking strength with the hydrophobic twelve carbon chain. Monomers such as tridecyl methacrylate, isodecyl methacrylate, lauryl methacrylate, and the like function as bound plasticizers, providing the hydrophobic environment, but may not provide temperature stability or strength contribution.

The hydrophobic monomers are present at combined concentrations of about 5 weight percent to about 50 weight percent, and more preferably at about 10 weight percent to about 35 weight percent of the total monomer content.

The flexible hydrophobic multi(meth)acrylate monomer can preferably be any flexible hydrophobic monomer having three or more methacrylate groups or acrylate groups. Alternatively, monomers containing both acrylate groups and methacrylate groups are envisioned. Examples of suitable compounds include bis (trimethylolpropane) tetramethacrylate, bis(trimethylolpropane) tetraacrylate, both alkoxylated trimethylolpropane trimethacrylate and alkoxylated bis(trimethylolpropane) tetramethacrylate with low levels of alkoxylation, and flexible urethane, epoxy, or polyester methacrylates with three or more methacrylate groups. A presently preferred multifunctional monomer is trimethylolpropane trimethacrylate. Mixtures of at least one multiacrylate and at least one multimethacrylate can be used.

The flexible hydrophobic multi(meth)acrylate monomer is preferably present at concentrations of about 5 weight percent to about 20 weight percent, and more preferably at about 10 weight percent to about 15 weight percent of the total monomer content.

The urethane methacrylate oligomer can generally be any of the urethane methacrylates, and more preferably urethane dimethacrylates or urethane trimethacrylates. Presently preferred urethane methacrylate oligomers are polyether urethane dimethacrylates and polyether urethane trimethacrylates.

The urethane methacrylate oligomer can generally be present at concentrations of about 20 weight percent to about 50 weight percent in the case of the dimethacrylate, or about 15 weight percent to about 40 weight percent in the case of the trimethacrylate in terms of total monomer content. If both a dimethacrylate and a trimethacrylate are present, the combined concentration can be about 15 weight percent to about 60 weight percent.

The photochromic dye can generally be any photochromic dye. Presently preferred photochromic dyes include the commercially available CNN7, CNN8, and CNN9 from Tokuyama Corporation (Tokyo, Japan), and Reversacol Ruby Red and Reversacol Corn Yellow from James Robinson Ltd. (Huddersfield, West Yorkshire, UK). Other dyes having utility with these preferred polymer matrices are in the 1,2b and 2,1b naphthopyran families. It should be noted that not all dyes will follow the behavior of these types. As disclosed in U.S. Pat. No. 5,914,174 (issued Jun. 22, 1999), certain dyes exhibited a deactivated color that was darker in the polar (hydrophilic) matrix. Surprisingly, this is opposite of what is observed with the preferred dyes in the preferred compositions. However, the effect noted in U.S. Pat. No. 5,914,174 has been observed with certain dyes, such as Reversacol Aqua Green (James Robinson Ltd.).

The compositions can comprise more than one photochromic dye. For example, the composition can contain 2, 3, 4, 5, or more photochromic dyes.

The photochromic dye can generally be present at any concentration. Presently preferred concentrations are about 0.002 weight percent to about 0.15 weight percent based on the weight of the composition. These weight percent values are per dye, i.e. a composition having multiple dyes could contain each dye independently at these concentration ranges. Those of skill in the art will appreciate that the use of thinner layers of photochromic materials may require higher dye concentrations to maintain similar photochromic performance. For example, for layers much thinner than about 1 mm, combined dye concentrations of up to about 50 weight percent can be used.

The composition can further comprise a polymerization initiator. The polymerization initiator can be present at a concentration of about 0.06 weight percent to about 2.0 weight percent based on the weight of the composition. The initiator can be a photoinitiator or a thermal curing initiator. Presently preferred is a photoinitiator which activates when exposed to light of a wavelength between about 380 nm and about 500 nm, such as Irgacure 819 [bis(2,4,6-trimethylbenzoyl) phenylphosphine oxide] or Irgacure 2020 [a mixture of 20% phenyl bis(2,4,6-trimethylbenzoyl) phosphine oxide and 80% 2-hydroxy-2-methyl-1-phenyl-propan-1-one] by Ciba Specialty Chemicals Corp. (Basel, Switzerland) added at about 0.06 weight percent to about 1 weight percent. In thermal curing applications, the presently preferred initiators are azo compounds such as Perkadox AMBN [2,2-azobis(2-methyl)butyronitrile] by Akzo Nobel Chemicals Inc. (Chicago, Ill.), and the like.

Alternatively, the composition can be prepared without a polymerization initiator. Polymerization in the absence of a polymerization initiator can be effected by methods such as treatment with an electron beam, ionizing radiation, ultraviolet radiation, or by thermal treatment.

The composition can further comprise one or more fixed dyes to effect color correction of the faded lens. The fixed dye is preferably at a concentration of less than about 0.001 weight percent based on the weight of the composition. Examples of fixed dyes include Sudan Blue 670 (BASF Corp., Mount Olive, N.J.), Keyplast Magenta M6B, Keyplast Violet 3B, Keyplast Oil Violet IRS (Keystone Aniline Corp., Chicago, Ill.), and the like.

The compositions can further comprise other additives. The other additives can include antioxidants, hindered amines, and other UV absorbers and stabilizers. If included, the preferred total concentration of the combined additives can be about 0.1 weight percent to about 20 weight percent based on the weight of the composition. More preferably, the total concentration of the combined additives can be about 1 weight percent to about 5 weight percent.

A specific example of the photochromic matrix layer composition containing a photochromic dye can comprise: about 5 weight percent to about 15 weight percent polyethylene glycol dimethacrylate (400), about 0 weight percent to about 24 weight percent isobornyl methacrylate, about 7 weight percent to about 20 weight percent trimethylolpropane trimethacrylate, about 20 weight percent to about 50 weight percent polyether urethane dimethacrylate, about 15 weight percent to about 40 weight percent polyether urethane trimethacrylate, and about 0 weight percent to about 20 weight percent other additives.

The photochromic matrix layer compositions preferably have viscosities of about 10 centistokes to about 24,000 centistokes at 25° C. prior to polymerization as determined by a Cannon-Fenske capillary viscometer. More preferably, the viscosities can be about 700 centistokes to about 24,000 centistokes prior to polymerization.

Tie Coating Compositions

The tie coating composition is compatible with both the polycarbonate lens blank and the photochromic matrix layer. The tie coating composition facilitates adhesion of the photochromic matrix layer to the polycarbonate lens blank by acting as the center layer of a three layer laminate or "sandwich".

The tie coating composition preferably has a "solvating effect" that physically modifies the polycarbonate surface and diffuses into it. Monomers that can solvate polycarbonate and solvents such as ketones are capable of exhibiting this solvating effect. The tie coating layer composition preferably does not significantly alter the optical clarity or ophthalmic properties of the polycarbonate lens.

One embodiment of the invention is directed toward tie coating compositions comprising one or more methacrylate monomers, a (meth)acrylated oligomer with a polycarbonate backbone, one or more urethane methacrylate oligomers and a solvent or solvent mixture.

The methacrylate monomer can generally be any methacrylate monomer that partially or fully solvates polycarbonate. Examples of such a monomer include isobornyl methacrylate, tetrahydrofurfural methacrylate, polyethyleneglycol dimethacrylate and methylmethacrylate. Presently preferred monomers are tetrahydrofurfural methacrylate and isobornyl methacrylate. The concentration of the monomer in the tie layer composition prior to polymerization is about 5 weight percent to about 25 weight percent of the non-volatile components of the tie layer composition.

(Meth) acrylated oligomers with a polycarbonate section in the aliphatic backbone provide improved adhesion to a polycarbonate lens surface. An example of such an oligomer is Sartomer CN9001, which is a currently preferred acrylate oligomer used for this purpose. The concentration of the oligomer in the tie layer composition prior to polymerization is about 20 weight percent to about 50 weight percent of the non-volatile components of the tie layer composition.

The urethane methacrylate oligomers are preferably a urethane dimethacrylate or a urethane trimethacrylate. Presently preferred urethane methacrylate oligomers are polyether urethane dimethacrylates and polyether urethane trimethacrylates (BR571M and BR146 respectively, both from Bomar Specialties Co.; Winstead, Conn.). The polyether urethane dimethacrylate is preferably at a concentration of about 20 weight percent to about 50 weight percent of the non-volatile components of the tie layer composition. The polyether urethane trimethacrylate is preferably at a concentration of about 15 weight percent to about 40 weight percent of the non-volatile components of the tie layer composition.

The solvent preferably both dissolves the monomer and oligomer mixture, and affects the surface properties of the polycarbonate lens blank. The solvent is preferably a volatile solvent. A mixture of isopropyl alcohol and methyl ethyl ketone is presently preferred as the solvent mixture. A solvent mixture of 25% (by weight) isopropyl alcohol and 75% (by weight) methyl ethyl ketone, when spun or flowed over a polycarbonate lens produces a uniform slight frost-like surface on the lens. When this solvent mixture is used to dilute the monomer/oligomer mixture by 50% or less, no frost occurs on the lens during the time required for the solvent to evaporate.

An initiator and an appropriate energy source provide a partial cure (B-stage) of the tie coating. This partial cure provides for some residual unsaturation to exist in the tie coat, allowing for covalent bonds to be formed with the photochromic layer during subsequent curing of the layers. This partial cure also prevents the monomeroligomers from flowing between application and final curing with the photochromic matrix composition. Additionally, the partial cure stops excessive monomer solvating effects to the polycarbonate from occurring. Preferred initiators are photo-initiators such as Irgacure 184, Irgacure 2020, and Irgacure 819 (Ciba Specialty Chemicals; Basel, Switzerland). The initiators may be used alone or in combination. The initiators are preferably present at concentrations of about 0.01 weight percent to about 8 weight percent of the composition, and more preferably at about 0.01 weight percent to about 6 weight percent of the composition. B staging can be performed using a Fusion type D bulb (Fusion UV Systems, Inc.; Gaithersburg, Md.). Final curing of the entire lens assembly can be performed using a Fusion type V bulb.

The tie layer composition can further comprise additives such as flow enhancers, leveling agents, adhesion promoters, antioxidants, UV absorbers, and UV stabilizers. These additives can total about 0 weight percent to about 5 weight percent of the nonvolatile components of the tie layer composition.

Polycarbonate Lenses

Generally any polycarbonate lens can be used in connection with the inventive compositions and methods. Lens blanks are commonly injected molded, and preferably are annealed in an oven for 3-4 hours at about 250° F. to about 260° F. (121° C. -127° C.) prior to application of the tie layer composition. Examples of polycarbonate materials include Lexan (GE Plastics; Pittsfield, Mass.) and Makrolon (Bayer Polymers; Leverkusen, Germany). The lenses can be cleaned with caustic solutions (such as 10 weight percent aqueous sodium hydroxide or potassium hydroxide at 150-180° F. (66-82 ° C.) and/or detergent solutions. The lenses can be rinsed with de-ionized water. The lenses are then thoroughly dried in a dry air or nitrogen atmosphere in a conventional oven at about 120° F. to about 200° F. (49° C. -93° C.) for about 15 minutes to about 60 minutes. Alternatively, a radiant IR source can be used for about 15 seconds to about 60 seconds to dry the lenses.

Methods of Preparing Photochromic Polycarbonate Lenses

Additional embodiments of the invention relate to methods of preparing photochromic polycarbonate lenses using one or all of the above described compositions.

The methods can generally comprise providing a polycarbonate lens blank, applying a tie layer composition to at least one face of the lens blank, allowing any volatile solvent in the tie layer composition to evaporate, at least partially polymerizing the tie layer composition to form a tie coating on the lens blank, casting a photochromic matrix layer composition to the tie layer, and fully polymerizing the tie coating composition and photochromic matrix layer composition to produce a photochromic polycarbonate lens.

The tie coating composition can be applied using generally any method such as flow coating, dip coating, or spin coating. It is presently preferred that spin coating be used for the application. Spin coater rotational speeds of about 400 rpm to about 2500 rpm can be used, with about 525 rpm to about 1600 rpm being presently preferred. The volatile solvent is allowed to evaporate during the spin cycle. The resulting tie coat thickness applied under these conditions is about 8 microns to about 16 microns.

The freshly applied tie coating can be B-stage cured under a UV lighting system such as a Fusion type D bulb for an exposure of about 600 mJ/cm$^2$ to about 2000 mJ/cm$^2$, with exposures of about 800 mJ/cm$^2$ to about 1300 mJ/cm$^2$ being presently preferred. Exposure measurements can be made using an IL390 Light Bug (International Light, Inc.; Newburyport, Mass.).

Multiple coats of the tie coating can be applied with B-staging exposures between coating applications, in order to increase the overall thickness of the tie coat layer (to about 20 microns to about 50 microns). These coatings are preferably applied by conventional flow-coating or spin-coating methods. Such multiple coats would be of benefit when photochromic layers are used that exhibit more significant shrinkage.

Lens Assembly Apparatus

The preparation of a photochromic polycarbonate lens can be performed using a gasket having a liquid tight seal when placed on the concave side of a lens mold. The gasket can generally be any suitable material such as a thermoplastic polyethylene copolymer or polyvinyl chloride.

The lens mold can be spherical, aspherical and/or multifocal. The gasket provides a spacing ledge that will keep the lens mold a prescribed distance from the tie coated polycarbonate lens blank, thus forming the space in which the photochromic matrix will be placed and cured. The space between the mold and the polycarbonate lens blank is preferably about 0.8 mm to about 1.2 mm thick. The mold is preferably matched to the surface of the lens blank in order to provide a space of consistent thickness, thus allowing the photochromic matrix to produce a uniformly thick layer across the lens. This type of photochromic composite assembly is described in Signet Armorlite's U.S. patent application Ser. No. 10/232,415, filed Aug. 30, 2002.

Prior to placing the mold in the gasket, the mold can optionally have a hard scratch resistant coating applied through in-mold coating as described in U.S. Pat. No. 4,758,448 (issued Jul. 19, 1988).

Alternatively, tape could be used in place of the gasket. An external fixturing device can hold the mold a given distance from the tie coated polycarbonate lens blank, and the tape applied circumferentially to the lens blank and mold outer edges, providing a space for the photochromic matrix. The tape could be polyester film, metal foil, or other good tensile strength material, with an adhesive that does not react or diffuse into the photochromic matrix during the time required for filling and curing. Similarly, any other suitable method for separating the casting surfaces can be used.

The photochromic matrix material can be applied at temperatures of about 70° F. (21° C.) to about 250° F. (121° C.). Preheating the photochromic matrix composition to about 120° F. (49° C.) to about 150° F. (66° C.) is presently preferred to facilitate the flow of the matrix onto the mold surface and tie coated polycarbonate lens blank.

When a gasket is used, the photochromic matrix is poured or injected onto the concave mold surface. The tie coated polycarbonate lens blank is then lowered onto the mold-gasket assembly containing the photochromic matrix material. Curing of the assembly can be accomplished immediately thereafter.

The photochromic matrix composition can be gelled immediately after assembly and prior to full curing. This can reduce the formation of striations in the photochromic layer. This gellation may be accomplished using diffuse light with wavelengths less than 500 nm from numerous sources, such as fluorescent light tubes, arc lamps, and/or microwave activated lamps.

The final curing of the assembly may be accomplished through light initiated or thermally initiated free radical polymerization. UV light initiated polymerization is presently preferred. Examples of suitable thermal initiators include azo compounds such as azobisisobutyronitrile (AIBN), 2,2'-azobis(2-methyl)butyronitrile (AMBN), and 2,2'-azobis(2,4-dimethyl)valeronitrile (ADVN), available from Akzo Nobel Chemicals, Inc., and/or E.I. DuPont De Nemours Chemical, Inc. Examples of suitable photoinitiators include phosphinates and phosphine oxides, particularly substituted phosphine oxides such as 2,4,6-trimethylbenzoyldiphenylphosphine oxide (BASF Lucirin TPO), ethyl 2,4,6-trimethylbenzoyldiphenylphosphinate (BASF Lucirin TPOL), bis(2,4,6-trimethylbenzoyl)phenylphosphine oxide (Ciba Specialty Chemicals Corp. Irgacure 819), and bis(2,6-dimethoxybenzoyl)-2,4,4-trimethylpentylphosphine oxide (Ciba Specialty Chemicals Corp. CGI 403).

After curing, the gasket or tape is removed, followed by removal of the mold. The resulting composite lens may then be processed using standard methods used for polycarbonate lenses.

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

EXAMPLES

Example 1

Materials

BR571M is an oligomeric urethane dimethacrylate, and BR146 is an oligomeric urethane trimethacrylate (both available from Bomar Specialties Co., Winsted, Conn.). SR423 is isobornyl methacrylate, SR350 is trimethylolpropane trimethacrylate, SR603 is polyethyleneglycol (400) dimethacrylate, CN9001 is an oligomeric urethane diacrylate with a polycarbonate backbone, and SR203 is tetrahydrofurfuryl methacrylate (all available from Sartomer Company, Inc., Exton, Pa.). Tinuvin 292 is bis(1,2,2,6,6,-pentamethyl-4-piperidinyl) sebacate with methyl (1,2,2,6,6,-pentamethyl-4-piperidinyl) sebacate (available from Ciba Specialty Chemicals, Inc., Basel, Switzerland). Initiators Irgacure 819, 2020, and 184 are also available from Ciba Specialty Chemicals.

Photochromic dyes CNN7, CNN8, and CNN9 are available from Tokuyama Corporation. Photochromic dyes Reversacol Ruby Red and Reversacol Corn yellow are available from James Robinson, Ltd.

Example 2

Preparation of Photochromic Composition

Two low-shrinkage photochromic matrices (Formulations A and B) were prepared for use in making composite photochromic polycarbonate lenses. The components were mixed with heating (120-160° F.; 49-71° C.) until a clear tinted solution resulted, with no apparent undissolved solids or material separation. The matrices both had viscosities of about 6000 cSt at 25° C.

TABLE 1

| Component | Weight Percent | Weight Percent relative to combined monomer composition |
|---|---|---|
| Photochromic Matrix Formulation A | | |
| BR571M | 38.7 | |
| BR146 | 19.3 | |
| SR423 | 16.9 | |
| SR350 | 16.9 | |
| SR603 | 8.2 | |
| CNN9 | | 0.03 |
| CNN7 | | 0.01 |
| Corn yellow | | 0.02 |
| Tinuvin 292 | | 0.9 |
| Irgacure 2020 | | 0.9 |
| Irgacure 819 | | 0.06 |
| Photochromic Matrix Formulation B | | |
| BR571M | 38.6 | |
| BR146 | 19.3 | |
| SR423 | 16.9 | |
| SR350 | 16.9 | |
| SR603 | 8.3 | |
| CNN9 | | 0.03 |
| CNN7 | | 0.01 |
| Corn yellow | | 0.03 |
| Tinuvin 292 | | 1.0 |
| Irgacure 2020 | | 0.2 |
| Irgacure 819 | | 0.06 |

Example 3

Preparation of Tie Coating Composition

A tie coating composition (Formulation C) was prepared for use in making composite photochromic polycarbonate sample lenses. The components were mixed at room temperature until a clear solution resulted, with no apparent undissolved solids or material separation. The resulting solution was stored in a dark sealed container until used, in order to prevent changes in the weight percentage of solids and/or premature gelling.

TABLE 3

Tie coating Formulation C

| Component | Weight Percent | Weight Percent relative to combined monomer composition |
|---|---|---|
| SR423 | 12.6 | |
| SR203 | 12.6 | |
| BR571M | 28.1 | |
| BR146 | 18.0 | |
| CN9001 | 28.7 | |
| Irgacure 819 | | 0.01 |
| Irgacure 2020 | | 2 |
| Irgacure 184 | | 4 |
| Methyl ethyl ketone (75% w/w)/isopropyl alcohol (25% w/w) solvent mixture | | 100 (equal to monomer weight) |

Example 4

Preparation of a Photochromic Polycarbonate Lens

A clean polycarbonate lens blank, with an approximate convex surface curvature of 6 diopters was dried in a 130 +/−10° F. (54 +/−5.5° C.) oven for 2 hours. The photochromic composition of Table 1 was heated in the oven at the same temperature, for approximately 30 minutes to reduce its viscosity.

The dried polycarbonate lens blank'was placed in a spin coater and spun at approximately 520 rpm. The tie coating composition of Table 3 was applied. The lens was allowed to spin an additional 15 seconds to allow for the solvent to evaporate. The resulting tie coat thickness was approximately 16 microns.

The tie coated lens blank was then B-staged at approximately 1220 mJ/cm$^2$ under a Fusion type D Bulb. The B-staged tie coated lens blank was returned to the 130 +/−10° F. (54 +/−5.5 ° C.) oven for 30 minutes.

A glass mold with a concave molding surface of approximately 6 diopters, was in-mold coated with a scratch resistant coating, and the coating was partially polymerized using a Fusion type D bulb. A gasket was placed on the mold. The heated photochromic composition was poured onto the concave surface of the mold, and the heated B-staged tie coated polycarbonate lens blank was lowered onto the gasket forming a tight assembly with no bubbles or air gaps.

The assembly was first placed over a fluorescent blue light bulb set (Philips Super Actinic, 40 watt, with a broad blue spectral output centered at about 420 nm) such that the light entered the assembly from the front mold and into the photochromic matrix composition, and was exposed for 30 seconds at an intensity of 700-850 microwatt/cm$^2$. The gelled assembly was then fully cured by exposing to light from a Fusion type V Bulb source for 30 minutes. In this case, the light entered the assembly first through the polycarbonate substrate then through the photochromic matrix. Light intensity was approximately 4 mw/cm$^2$. These measurements were made using an International Light 1400A-based radiometer system equipped with a 405 nm narrow band pass filter.

After removal of the mold and gasket, the resulting composite semi-finished lens blank was processed to a finished lens having a uniform thickness of about 2 mm. The lens was tested according to the following Examples.

Example 5

Physical Properties of Photochromic Polycarbonate Lenses

The lenses can be successfully processed using standard processing tooling and methods used for commercial polycarbonate lenses. No delamination occurred when the lenses were exposed to alternating boiling water and ice water exposures (5 minutes each) through 5 cycles.

Three-piece eyeglass frames are a challenging design requiring a tough lens material to survive the stresses at the points of frame attachment. These points of attachment are holes drilled near the edge of the lens. A severe test of this toughness may be accomplished by placing a rigid rod into a 1.5 mm diameter hole drilled through a processed lens approximately 4 mm from the outer edge, and placing a 295 gram weight at successively farther distances from the lens front until a crack forms at the hole. For this measurement, the rod has 1-cm slots along its length up to 23 cm from the lens.

No delamination occurred on the Formulation A lens at any weight location along the entire 23-cm rod. The bending moment largely deformed the lens while the weighted shaft was present, but the lens returned to its original shape when the rod was removed.

For Formulation B, localized delamination occurred when the weight was placed on the rod 12-15 cm from the lens. No cracking occurred, even when the weight was at the 23 cm position.

Example 6

Photochromic Properties of Photochromic Polycarbonate Lenses

The photochromic lenses were evaluated for their faded transmission, darkened transmission, and time to fade through 80% of dynamic range. A xenon arc solar simulator was used as a uniform light source to activate the photochromic response for all lenses. A 1.6 KW Large Area Light Source, Model 92190-1000 and a 1600 W Arc Lamp Power Supply, Model 68922 (both manufactured by Spectra-Physics (formerly Oriel Corp.); Stratford, Conn.) formed the basis of the activating light source. Light intensity was maintained during testing, using a Spectra-Physics Oriel Light Intensity Controller, model 68851. The output of the simulator was modified using airmass correction filters to be capable of approximating sunlight at 50,000 lux (+/−3,000 lux) with a UVA content of 6.5 to 11 W/m$^2$ integrated from 315 to 380 nm as provided by ISO standard 8980-3.

Light intensity of the solar simulator was set and checked using an Ocean Optics Inc. spectrophotometer, model USB2000. The spectrophotometer was calibrated using a Spectra-Physics Oriel Standard Spectra Irradiance bulb (Model 63350), with a specified range of 250-2400 nm and a suitable radiometric power supply (Spectra-Physics Oriel Model 69935).

The light transmission through the sample lenses was measured using a flunterLab UltraScan XE. This testing device was outfitted with a quartz sample cell to hold the test lens in a temperature controlled water bath. The sample cell was exposed to the simulated sunlight for approximately 30 seconds, then positioned to the Ultra-Scan's measurement port within one second for the measurement flash of the xenon bulb, and then positioned into the simulated sunlight within one second, and the cycle was repeated for a total exposure time. Readings were then taken without exposure to the simulator at 30 second intervals.

The sample cell water temperature was maintained within 0.1° C. by a Haake F8 temperature controlled water bath (Thermo Haake; Karlsruhe, Germany). This unit had both a delivery pump and a receiving pump to transfer water to and from the quartz sample cell. Since transmission readings were made with the samples in a water bath, corrections were made to determine equivalent air transmission values.

The weighted average percent transmission per timed measurement for each lens was determined by using a photopic correction for the individual transmission data for each wavelength analyzed (method is described in ISO Standard 8980-3). Transmission data was collected between 360-750 nm, at 10 nm intervals.

The simulated sunlight intensity was set at 50 klux +/−2% for the visible range, and the UV portion integrated between 315 and 380 nm had an irradiance of 8.7 to 9.0 W/m$^2$. This condition was set by using an Air Mass 0 plus two Air Mass 1 filters in series in the xenon solar simulator. This light condition was used for darkening all lens samples.

Prior to testing, all lenses were conditioned for the initial faded state. Lenses were conditioned for a minimum of 8 hours under fluorescent room light measured at 440+/−20 lux.

A short fade time is an extremely desirable property for a photochromic lens. High faded transmissions, low darkened transmissions, and high dynamic range values are also desirable. The dynamic range (DR) is the difference between the percent faded transmission and the percent darkened transmission. For example, if the faded transmission is 90%, and the darkened transmission is 40%, the dynamic range (DR) is 50%.

TABLE 4

Photochromic Performance of Sample Lens

| Property | Sample A | Sample B |
| --- | --- | --- |
| Time to Fade 80% | 5.6 minutes | 5.2 minutes |
| Time to Darken 80% | 0.76 minutes | 0.63 minutes |
| % T, Faded | 83.8% | 84.0% |
| % T, Darkened | 18% | 16.2% |
| DR | 65.8% | 67.8 |

Example 7

Preparation of Photochromic Composition

An additional photochromic composition was prepared as follows (Formulation D).

TABLE 5

Photochromic matrix composition Formulation D

| Component | Weight percent | Weight percent relative to combined monomer composition |
| --- | --- | --- |
| BR571M | 40 | |
| BR146 | 20 | |
| SR423 | 17.5 | |

TABLE 5-continued

Photochromic matrix composition Formulation D

| Component | Weight percent | Weight percent relative to combined monomer composition |
|---|---|---|
| SR350 | 14 | |
| SR603 | 8.5 | |
| CNN9 | | 0.036 |
| CNN7 | | 0.012 |
| Corn yellow | | 0.0264 |
| Tinuvin 292 | | 1.0 |
| Irgacure 819 | | 0.16 |

Example 8

Preparation of Photochromic Polycarbonate Lens

The photochromic matrix composition and tie coat composition as detailed in Tables 3 and 5 were used to prepare a photochromic polycarbonate lens using the following procedure.

An annealed polycarbonate lens with the desired front base curve was provided. The lens was washed to remove any surface contaminants, and blown dry to remove the water. The lens was treated with a 1000 W Heraeus carbon infrared emitter (Heraeus Amersil, Inc.; Deluth, GA) for 30 seconds to reach a surface temperature of about 160-170° F. (71-77° C.). Tie coat composition was applied with spin-coating, and the volatile solvent was allowed to evaporate for 15 seconds while spinning. The coated lens was B-staged by exposure to a Fusion D bulb (exposure of about 1200 mJ/cm² centered at 360 nm, measured with an IL390 Light Bug (International Light, Inc., Newburyport, Mass.).

A mold was assembled with a gasket that provides approximately 1 mm spacing between the concave mold surface and the convex polycarbonate lens surface. The concave mold surface matches the convex polycarbonate lens surface. The mold was pre-treated with a B-staged in-mold scratch-resistant coating.

The photochromic matrix composition was heated to about 150° F. (66° C.) and poured onto the concave surface of the mold/gasket assembly. The B-staged tie coated polycarbonate lens was placed onto the mold/gasket assembly with care to minimize the formation or capture of bubbles. The mold/gasket/lens assembly was exposed to 700-850 microwatt/cm² (measured with an International Light I400A radiometer with a 405 nm narrow band pass filter) of fluorescent blue light provided by a Philips Super Actinic 40 watt lamp (with a broad blue spectrum centered at 420 nm). The exposure was for 30 seconds through the mold side of the assembly to quickly gel the photochromic layer. The assembly was cured under light from a Fusion V Bulb for 30 minutes. The light was positioned above and shining through the polycarbonate lens portion of the assembly. The light intensity entering the assembly was approximately 4 mw/cm², measured at 405 nm using an International Light 1400A based radiometer system equipped with a 405 nm narrow band pass filter.

The cured lens was cooled to a maximum surface temperature of 85° F. (29° C.) prior to opening the assembly. The lens hard coating was post cured with light from a Fusion H bulb with an approximate exposure of 2000 mj/cm² (measured with an International Light, Inc. IL390 Light Bug).

Example 9

Comparative Evaluation of Photochromic Lenses

The polycarbonate lens prepared in the previous Example was evaluated against the leading commercially available photochromic polycarbonate lens (Transitions® Polycarbonate, also known as Quantum Polycarbonate; Transitions® is a registered trademark of Transitions Optical, Inc.). Performance data was also collected for two leading non-polycarbonate photochromic lenses (Transitions® 1.50 "Next Generation" and Corning Sunsensors®; Sunsensors® is a registered trademark of Corning, Inc.). Lenses were tested in the 2 mm plano configuration.

The following Table shows the photochromic performance data for lenses tested at 23° C. The inventive lens of Example 8 is superior to the Transitions® Polycarbonate lens in all measurements, especially in the time to fade measurement. The time to fade value for the lens of Example 9 is also faster than the non-polycarbonate lens products. The time to darken value is comparable or better to the values obtained from the other products.

In the following three tables, % T, Faded refers to the percent transmission of the lens in the faded state; % T, Darkened refers to the percent transmission of the lens in the darkened state; Trans. Poly. refers to the Transitions® Polycarbonate lens; Trans. 1.50 refers to the Transitions® "Next Generation" 1.50 index lens; and Sunsensors® refers to the Corning Sunsensors® lens. The latter two lenses are non-polycarbonate lenses.

TABLE 6

Photochromic comparisons at 23° C.

| | Example 8 | Trans. Poly. | Trans 1.50 | Sunsensors ® |
|---|---|---|---|---|
| Time to fade 80% (minutes) | 5.7 | 11.1 | 12.2 | 31.1 |
| Time to darken 80% (minutes) | 0.6 | 0.9 | 0.6 | 1.3 |
| % T, Faded | 85.3 | 84.7 | 88.1 | 86.4 |
| % T, Darkened | 15.0 | 19.0 | 10.1 | 18.4 |
| DR | 70.3 | 65.7 | 78.0 | 68.0 |

The same measurements were performed with lenses at 35° C. This temperature is representative of lens use in warm environments. The lens of Example 8 compared positively to the Transitions® Polycarbonate lens in transmission values and time to darken. It was superior in time to fade to all of the tested lenses.

TABLE 7

Photochromic comparisons at 35° C.

| | Example 8 | Trans. Poly. | Trans 1.50 | Sunsensors ® |
|---|---|---|---|---|
| Time to fade 80% (minutes) | 1.3 | 2.3 | 4.8 | 6.9 |
| Time to darken 80% (minutes) | 0.5 | 0.5 | 0.6 | 1.0 |
| % T, Faded | 85.4 | 85.1 | 87.9 | 86.5 |
| % T, Darkened | 34.3 | 34.7 | 23.9 | 41.9 |
| DR | 51.1 | 50.4 | 64.0 | 44.6 |

Next, the same measurements were performed with lenses at 5° C. This temperature is representative of lens use in cold environments. The lens of Example 8 has acceptable faded transmission and time to darken values. The time to fade value is again significantly better for the Example 8 lens than that for all other products tested (because low temperatures significantly reduce the fade back time for all commercial photochromic products, the time to fade is reported here through 30% of the dynamic range of the lens from the darkened state).

TABLE 8

Photochromic comparisons at 5° C.

| | Example 8 | Trans. Poly. | Trans 1.50 | Sunsensors ® |
|---|---|---|---|---|
| Time to fade 30% (minutes) | 13.6 | 20.8 | 31.4 | 28.9 |
| Time to darken 80% (minutes) | 1.0 | 1.9 | 1.0 | 1.9 |
| % T, Faded | 85.4 | 84.9 | 87.7 | 86.3 |
| % T, Darkened | 4.3 | 8.9 | 3.1 | 4.5 |
| DR | 81.1 | 76.0 | 84.6 | 81.8 |

Example 10

Weathering Data of Photochromic Lenses

The lens from Example 8 and the Transitions® Polycarbonate lens were tested under conditions to simulate long term weathering of the lenses. The photochromic performance of each lens was tested as previously described in Example 6, with a 15 minute exposure to the solar simulator and a 5 minute fade back. Lenses were tested at 23° C. The lenses were then exposed to the sun in a fixed position facing south at a 35° tilt above horizontal (San Diego County, Calif.). Exposure was for 10 days beginning on Apr. 11, 2003. After exposure, the lenses were brought inside and were placed on a horizontal tray under fluorescent room light (350-750 lux) for a minimum of 24 hours. The lenses were then tested as before.

Properties of interest in weathering studies are changes in: photochromic activity, fade transmission, and yellow index. Photochromic activity is the dynamic range of the lens, that is the difference between the percent transmission of the faded state and that for the darken state. It is desirable that the photochromic activity decrease as little as possible over the life of an exposed lens. Faded state transmission often decreases as a lens is weathered from sunlight, so smaller decreases are preferred. Yellow Index describes how yellow a lens is. Typically, plastic lenses yellow with exposure to sun. It is desirable that the Yellow Index as small as possible. Time to Fade was not determined, as this value does not change appreciably with exposure to sun on most photochromic products.

TABLE 9

Weathering effects on photochromic lenses

| | Example 8 | Trans. Poly |
|---|---|---|
| Decrease in Photochromic Activity as a Percentage of Original Activity | 4.6 | 25.7 |
| Change in Faded Transmission | −3.2 | −9.3 |
| Change in Yellow Index | 1.4 | 4.3 |

The lens of Example 8 resisted negative sun weathering effects better than the Transitions® Polycarbonate lens as determined by all three measured parameters. The decrease in photochromic activity was also significantly smaller for the Example 8 lens.

Due to the chemical compositions of the photochromic matrix compositions and tie layer compositions, photochromic polycarbonate lenses are prepared having favorable photochromic performance values. The disclosed compositions and methods of using them to prepare photochromic polycarbonate lenses are a significant improvement over the previously reported art and the currently available commercial products.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the methods described herein without departing from the concept and scope of the invention. More specifically, it will be apparent that certain agents which are chemically related may be substituted for the agents described herein while the same or similar results would be achieved. All such similar substitutes and modifications apparent to those skilled in the art are deemed to be within the scope and concept of the invention.

What is claimed is:

1. A photochromic matrix layer composition comprising: a monomer mixture comprising:
   a flexible hydrophilic dimethacrylate monomer, comprising at least one of a polyethylene glycol dimethacrylate, a urethane dimethacrylate, an epoxy dimethacrylate and/or a polyester dimethacrylate;
   a hydrophobic monomer, comprising at least one of isobornyl methacrylate, 1,12-dodecanediol dimethacrylate and/or tridecyl methacrylate;
   a flexible hydrophobic multi(meth)acrylate monomer, comprising at least one of trimethylolpropane trimethacrylate, bis(trimethylolpropane) tetraacrylate, bis(trimethylolpropane) tetramethacrylate, an alkoxylated trimethylolpropane trimethacrylate, an alkoxylated bis(trimethylolpropane) tetramethacrylate, a urethane methacrylate with three or more methacrylate groups, an epoxy methacrylate with three or more methacrylate groups and/or a polyester methacrylate with three or more methacrylate groups;
   a urethane methacrylate oligomer, comprising at least one of a polyether urethane dimethacrylate and/or a polyether urethane trimethacrylate; and
   a photochromic dye.

2. The composition of claim 1, comprising two or more hydrophobic monomers.

3. The composition of claim 1, comprising two or more urethane methacrylate oligomers.

4. The composition of claim 1, comprising two or more photochromic dyes.

5. The composition of claim 1, wherein the flexible hydrophilic dimethacrylate monomer is polyethylene glycol (400) dimethacrylate.

6. The composition of claim 1, wherein the flexible hydrophilic dimethacrylate monomer is present at a concentration of about 20 weight percent to about 50 weight percent of the monomer mixture.

7. The composition of claim 1, wherein the hydrophobic monomer is present at a concentration of about 5 weight percent to about 50 weight percent of the monomer mixture.

8. The composition of claim 1, wherein the flexible hydrophobic multi(meth)acrylate monomer is present at a concentration of about 5 weight percent to about 20 weight percent of the monomer mixture.

9. The composition of claim 1, wherein the urethane methacrylate oligomer is present at a concentration of about 15 weight percent to about 60 weight percent of the monomer mixture.

10. The composition of claim 1, wherein the photochromic dye is present at a concentration of about 0.002 weight percent to about 0.15 weight percent of the composition.

11. The composition of claim 1, containing 2, 3, 4, or 5 photochromic dyes.

12. The composition of claim 11, wherein each of the dyes are independently present at a concentration of about 0.002 weight percent to about 0.15 weight percent of the composition.

13. The composition of claim 1, further comprising a polymerization initiator.

14. The composition of claim 13, wherein the polymerization initiator is present at a concentration of about 0.06 weight percent to about 2.0 weight percent based on the weight of the composition.

15. The composition of claim 1, characterized by having a viscosity of about 10 cSt to about 24,000 cSt at 25° C.

16. The composition of claim 1, further comprising a fixed dye.

* * * * *